(12) United States Patent
Cho et al.

(10) Patent No.: US 6,595,423 B2
(45) Date of Patent: Jul. 22, 2003

(54) OPTICAL CONNECTION APPARATUS FOR HAND-HELD PERSONAL COMPUTER AND DOCKING STATION

(75) Inventors: Woo-jong Cho, Suwon (KR); Jung-bum Seo, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 226 days.

(21) Appl. No.: 09/725,942

(22) Filed: Nov. 30, 2000

(65) Prior Publication Data

US 2003/0111538 A1 Jun. 19, 2003

(30) Foreign Application Priority Data

Feb. 24, 2000 (KR) .......................................... 2000-9075

(51) Int. Cl.[7] ................................................. G06K 7/10
(52) U.S. Cl. ................... 235/472.01; 235/441; 235/486
(58) Field of Search ................................. 235/492, 441, 235/486, 487, 472.01, 472.03; 359/159, 163; 385/139; 361/686, 689; 439/638

(56) References Cited

U.S. PATENT DOCUMENTS

| | | | | |
|---|---|---|---|---|
| 5,522,691 A | * | 6/1996 | Anderson et al. | 414/781 |
| 5,767,892 A | * | 6/1998 | Mikami | 347/264 |
| 6,236,486 B1 | * | 5/2001 | Nocker, IV | 359/159 |
| 6,386,768 B1 | * | 5/2002 | Yoon et al. | 385/53 |
| 6,407,914 B1 | * | 6/2002 | Helot | 361/683 |
| 6,434,315 B1 | * | 8/2002 | Grois et al. | 385/139 |

* cited by examiner

Primary Examiner—Thien M. Le
(74) Attorney, Agent, or Firm—Sughrue Mion, PLLC

(57) ABSTRACT

An optical connecting module for a hand-held personal computer (HHPC) and a docking station is provided. The optical connecting module includes a first optical module installed in the HHPC, having a first optical device for converting an electrical signal and/or an optical signal into an optical signal and/or an electrical signal, respectively. A second optical module is installed in the docking station and has a second optical device for converting an electrical signal and/or an optical signal into an optical signal and/or an electrical signal, respectively. A coupling unit is provided for slidably coupling the HHPC and the docking station such that coupling sides of the HHPC and the docking station contact each other, thereby aligning the first and second optical devices for optical transmission and reception.

19 Claims, 9 Drawing Sheets

OPTICAL CONNECTION APPARATUS FOR HAND-HELD PERSONAL COMPUTER AND DOCKING STATION

BACKGROUND OF THE INVENTION

1. Field of the Invention

The present invention relates to an apparatus for optical connection between hand-held personal computer (HHPC) and a docking station such as a desk top computer.

2. Description of the Related Art

Hand-held personal computers (HHPCs), so-called "Palm PCs", which are able to receive hand-written information without the need for an extra input device, have a data storage function for keeping private information and schedule management, in addition to having a wireless communications function with another computer or facsimile.

HHPCs recognize characters written with an electronic pen on a liquid crystal screen thereof, and thus no complicated techniques are required in using HHPCs. Also, HHPCs allow a user to exchange facsimile data, such as packet audio or cellular packet data, and e-mails with a remote-site counterpart at any place, through a modem or a global wireless communications network.

For data communications, HHPCs are interconnected with a docking station such as a desk top PC, on which a wireless data communication model is mounted, by means of a connecting apparatus.

A conventional connecting apparatus is shown in FIG. 1. As shown in FIG. 1, the conventional connecting apparatus includes an electrical connector 2 at one edge of a HHPC 1, and a connection jacket 6 at a docking station 5. The electrical connector 2 has a structure that is able to receive a plurality of metal pins.

In the conventional connecting apparatus, possible unsecured coupling between the electrical connector 2 and the connection jacket 6 may cause a failure in electrical connection. Thus, there is a need for a plurality of locking elements to secure a stable and binding connection between the electrical connector 2 and the connection jacket 6. However, use of such locking elements unfavorably increases the size of the HHPCs, which goes against the need for miniature HHPCs. Moreover, the coupling apparatus is liable to be damaged or broken by external impact.

SUMMARY OF THE INVENTION

To solve the above problems, it is an objective of the present invention to provide an optical connecting apparatus for a hand-held personal computer (HHPC) and a docking station with an improved structure, which secures stable optical communications between the HHPC and the docking station.

The objective of the present invention is achieved by an optical connecting apparatus for a hand-held personal computer (HHPC) and a docking station, comprising: a first optical module installed in the HHPC, having a first optical device which converts an electrical signal and/or an optical signal into an optical signal and/or an electrical signal, respectively; a second optical module installed in the docking station, having a second optical device which converts an electrical signal and/or an optical signal into an optical signal and/or an electrical signal, respectively; and a coupling unit which slidably couples the HHPC and the docking station such that coupling sides of the HHPC and the docking station contact each other, thereby aligning the first and second optical devices for optical transmission and reception.

Preferably, the coupling unit comprises at least one slit formed at one of the coupling sides, and at least one rail formed projecting from the other coupling side, to be slidably fitted with the slit.

Preferably, the first optical module comprises: a first core for supporting the first optical device so that the first optical device is exposed to the outside; and a first driving circuit for driving the first optical device.

Preferably, the first optical module further comprises an elastic member installed between the first core and the other side of the HHPC far from the coupling side, for absorbing impact.

Preferably, the second optical module comprises: a second core for supporting the second optical device so that the second optical device is exposed to the outside; and a second driving circuit for driving the second optical device.

Preferably, the second core is installed to be movable, and the second optical module further comprises a plurality of springs for elastically biasing the second core in at least two directions to fix the position of the second core, and absorbing impact applied to the second core.

Preferably, the optical connecting apparatus further comprises a pair of stoppers formed at the facing coupling sides of the HHPC and the docking station, respectively, wherein the stoppers restrict the sliding distance when the HHPC is slidably coupled with the docking station for alignment of the first and second optical devices.

Preferably, the optical connecting apparatus further comprises a shutting unit for exposing the first optical device and/or the second optical device facing each other when the HHPC and the docking station are coupled each other, and for blocking the first optical device and/or the second optical device from the outside when the HHPC and the docking station are separated from each other.

Preferably, the shutting unit comprises: a first shutter installed to be slidably movable in the HHPC, for blocking and exposing the first optical device from and to the outside; a first spring for elastically biasing the first shutter to cover the first optical device; a second shutter installed to be slidably movable in the docking station, for blocking and exposing the second optical device from and to the outside; a second spring for elastically biasing the first shutter to cover the second optical device; and first and second catches installed at the HHPC and the docking station, respectively, for catching the first and second shutters, respectively, when the HHPC and the docking station are coupled each other, to expose the first and second optical devices, respectively.

Preferably, the second optical module is installed to be movable in an optical transmission direction, and the optical connecting apparatus further comprises a moving unit for moving the second optical module towards the first optical module when the HHPC and the docking stations are coupled each other, to align the first and second optical device with a predetermined distance therebetween, and for placing the second optical module back into its original position.

Preferably, the moving unit comprises: an elastic member for elastically biasing the second optical module outwardly; a guide pin mounted at the second optical module; a first rotating lever having a first slot for guiding the movement of the second optical module along with the guide pin, the first rotating lever installed in the docking station to be movable between a first position where the second optical module is allowed to move outwardly, and a second position where the second optical module is kept within the docking station; a second rotating lever whose one end, which extends from a hinge projects out of the coupling side of the docking station, and whose other end, which extends from the hinge, is connected to the first rotating lever, the second rotating lever rotating when the one end is pressed by the HHPC slidably coupled with the docking station, thereby placing the first rotating lever into the first position; and a torsion spring for elastically biasing the second rotating lever to project the one end of the second rotating lever from the coupling side of the docking station.

Preferably, the second rotating lever has a keeper at the other end, and the second rotating lever has a second slot for guiding the movement of the first rotating lever between the first and second positions, along with the keeper.

Preferably, the first and second optical modules have a guide groove and a guide projection, respectively, which fit together, for alignment between the first and second optical devices.

Preferably, the first optical module comprises a third core with a slanted side in the HHPC, for supporting the first optical device at a predetermined angle with respect to the coupling side, and the second optical module comprises a fourth core rotatably installed in the docking station, for supporting the second optical device, wherein the optical connecting apparatus further comprises a rotating unit for rotating the second optical module into a third position to align the second optical device with the first optical device when the HHPC and the docking station are coupled to each other, and into a fourth position to retain the second optical device within the docking station when the HHPC is detached from the docking station.

Preferably, the rotating unit comprises: a spring for elastically biasing the second optical module into the third position; a rotating member whose one end, which extends from a hinge projects out of the coupling side of the docking station, and whose other end, which extends from the hinge, is connected to the fourth core, the rotating member rotating when the one end is pressed by the HHPC slidably coupled with the docking station, thereby placing the second optical module into the third position; and a torsion spring for elastically biasing the rotating member to project the one end of the rotating member from the coupling side of the docking station so as to suppress the movement of the second optical module into the third position.

Preferably, the rotating member has a guide pin at the other end, and the fourth core has a slot for guiding the movement of the second optical module between the third and fourth positions, along with the guide pin.

BRIEF DESCRIPTION OF THE DRAWINGS

The above objective and advantages of the present invention will become more apparent by describing in detail preferred embodiments thereof with reference to the attached drawings, in which.

DETAILED DESCRIPTION OF THE PREFERRED EMBODIMENTS

Figure 1:
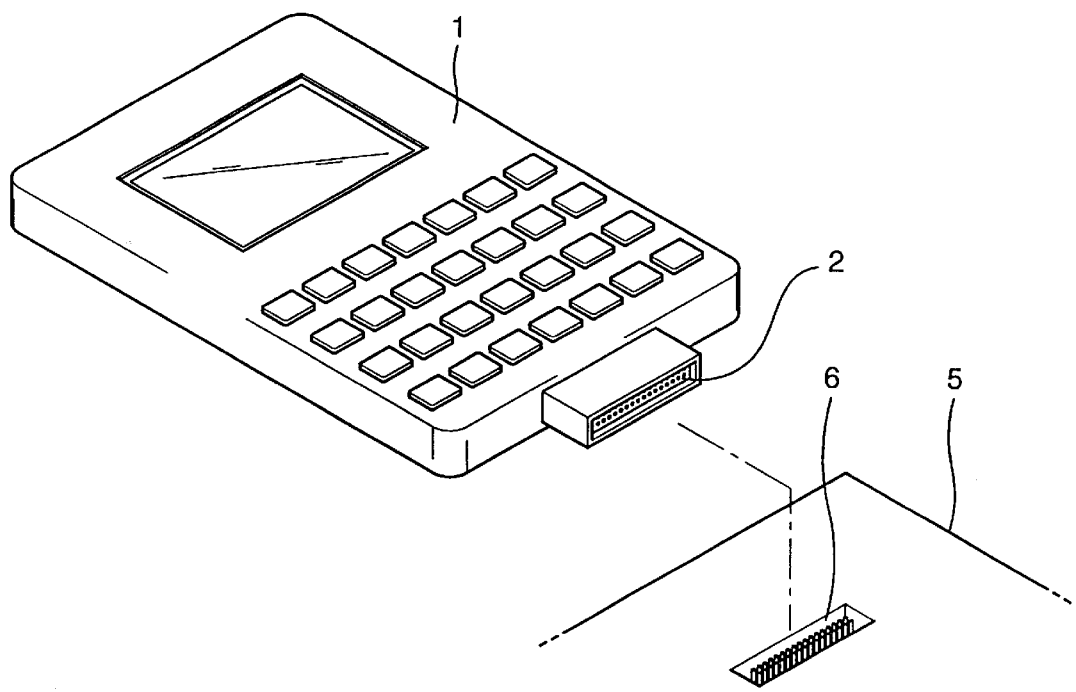
FIG. 1 is a perspective view of a conventional connecting apparatus for a hand-held personal computer (HHPC)
Figure 2:
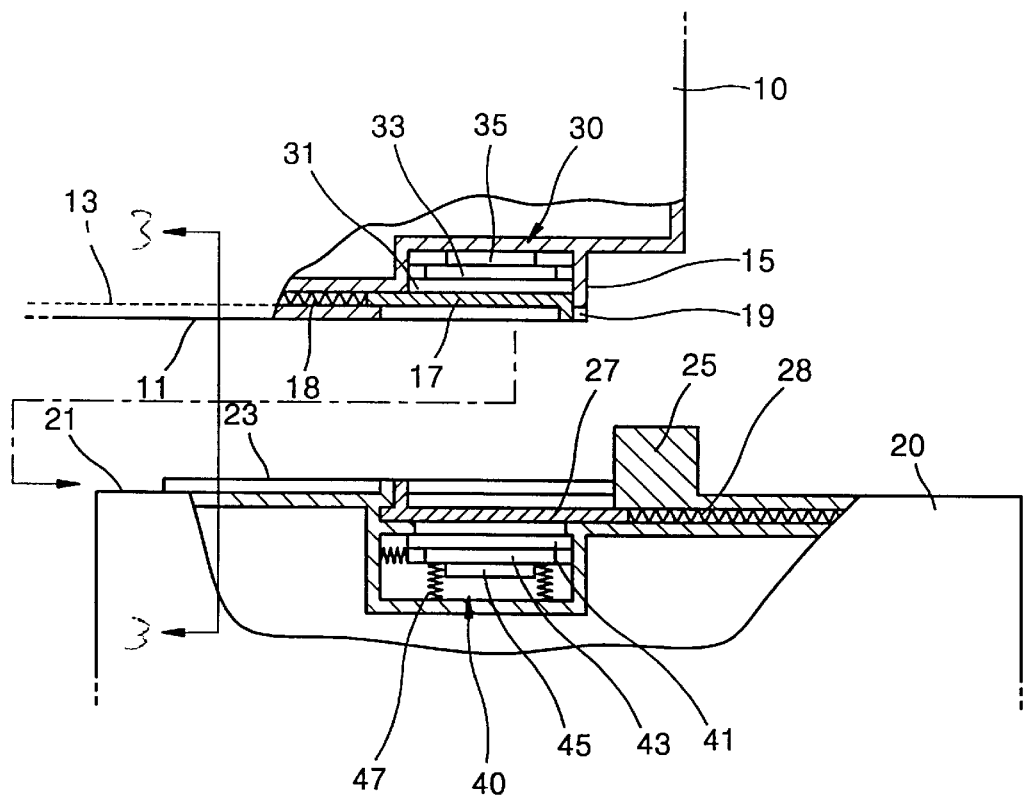
FIG. 2 is a sectional view showing a part of an optical connecting apparatus for a HHPC and a docking station according to a preferred embodiment of the present invention.

Referring to FIG. 2, an embodiment of an optical coupling apparatus for a hand-held personal computer (HHPC) and a docking station includes a first optical module 30 embedded in the HHPC 10, a second optical module 40 embedded in the docking station 20, and a coupling unit C.

The first optical module 30 includes at least one first optical device 31 placed at the outermost portion of the first optical module 30 close to a coupling side 11 of the HHPC 10, a first core 33 for supporting the first optical device 31, and a first driving circuit 35 for driving the first optical device 31 while being supported by the first core 33. The first optical module 30 having such configuration is fixed in the HHPC 10.

The first optical device 31 converts an electrical signal and/or an optical signal into an optical signal and/or an electrical signal, respectively. The first optical device 31 is comprised of a light emitting device and a photo-receiving device, which enables bi-directional communications between the HHPC 10 and the docking station 20. The light emitting device may be a semiconductor laser or a photodiode, for converting an electrical signal from the docking station 20 into an optical signal, and the photo-receiving device may be a photodiode for converting an optical signal into an electrical signal. As for communications through a plurality of channels, the first optical device 31 may include a plurality of light emitter devices and photo-receiving devices arranged in the form of an array corresponding to the multiple channels.

Similar to the first optical module 30, the second optical module 40 includes at least one second optical device 41, a second core 43 for supporting the second optical device 41, and a second driving circuit 45 for driving the second optical device 41 while being supported by the second core 43. The second optical device 41 is mounted at the outermost portion of the second optical module 40 close to a coupling side 21 of the docking station 20, and performs the same function as that of the first optical device 31 with the same configuration. The second optical module 40 having such configuration may be fixed in the docking station 20. Alternatively, the second optical module 40 may be elastically supported by a plurality of springs 47 within the docking station 20. As shown in FIG. 2, the springs 47 fix the position of the second core 42 by applying pressure in at least two directions. The springs 47 relieve impact applied to the second core 43.

Figure 3:
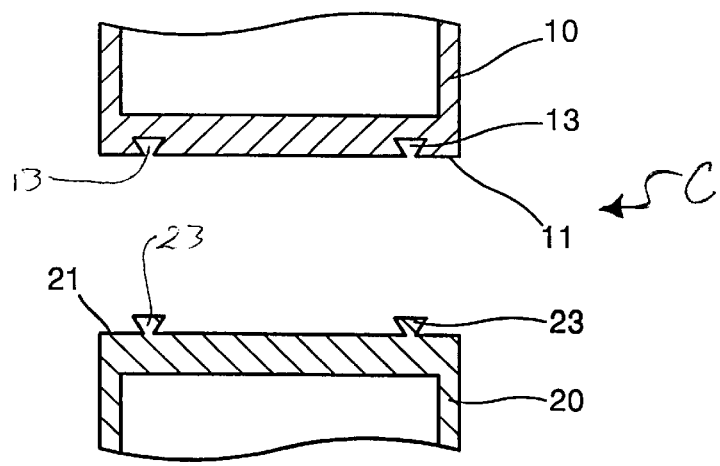
FIG. 3 is a sectional view taken along line 3—3 of FIG. 2.
Figure 4:
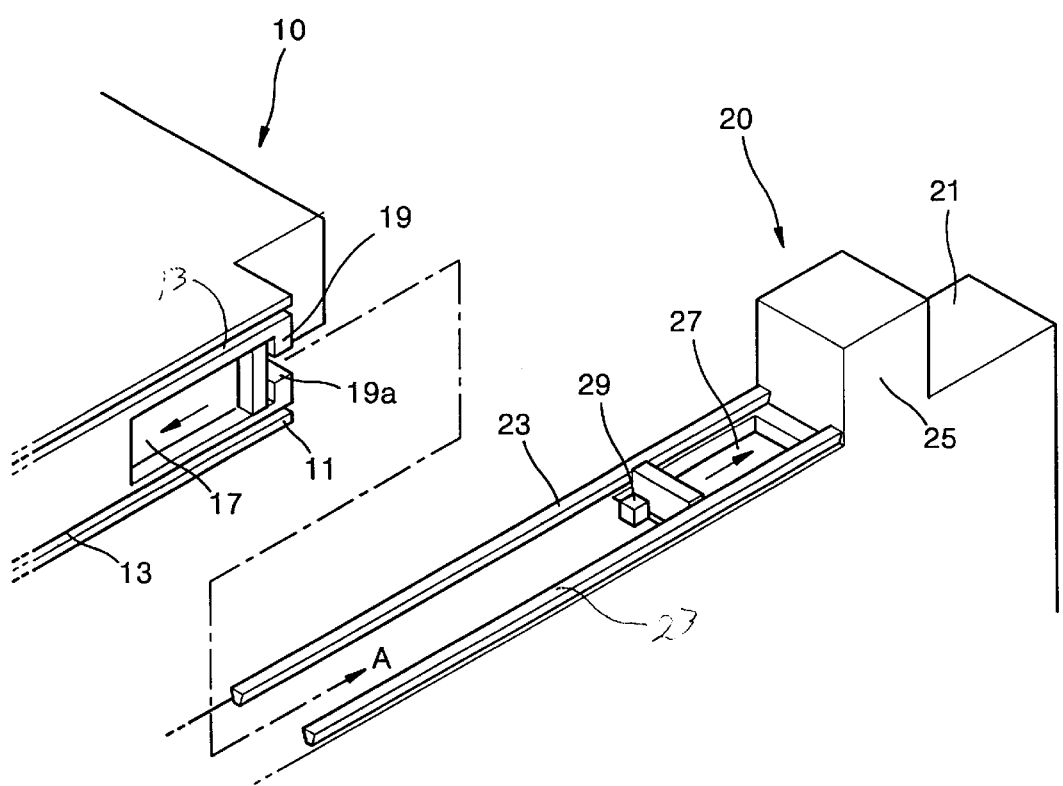
FIG. 4 is a perspective view of the main portions from FIG. 2.

The coupling unit C is for slidably coupling the two coupling sides 11 and 21, such that the first and second optical devices 31 and 41 are aligned facing each other with a predetermined distance for optical transmission and reception between the same. As shown in FIG. 3, the coupling unit C includes a pair of slits 13 formed in the coupling side 11 of the HHPC 10, and a pair of rails 23 projecting from the coupling side 21 of the docking station 20, so that the slits 13 and the rails 23 fit together. As shown in FIG. 4, after bringing the coupling side 11 into contact with the coupling side 21, the slits 13 and the rails 23 are slidably coupled by pushing the HHPC 10 in a direction A. Alternatively, the slits 13 may be formed in the coupling side 21 of the docking station 20, while the rails 23 may be formed in the coupling side 11 of the HHPC 10. The slide-type coupling unit C provides a stronger binding force compared to a conventional push-type coupling means, and has a compact structure durable against external impact. In other words, as long as the slits 13 are not intentionally drawn out from the rails 23, the coupling state can be wholly maintained even if external impact is applied to the coupling structure. Thus, there is no need for an extra locking device.

A stopper 25 is formed protruding from the coupling side 21 of the docking station. The stopper 25 restricts the movement of the HHPC 10 in the direction A for alignment of the first and second optical devices 31 and 41. In addition, a complementary stopper 15 is formed in the HHPC 10.

Figure 5:
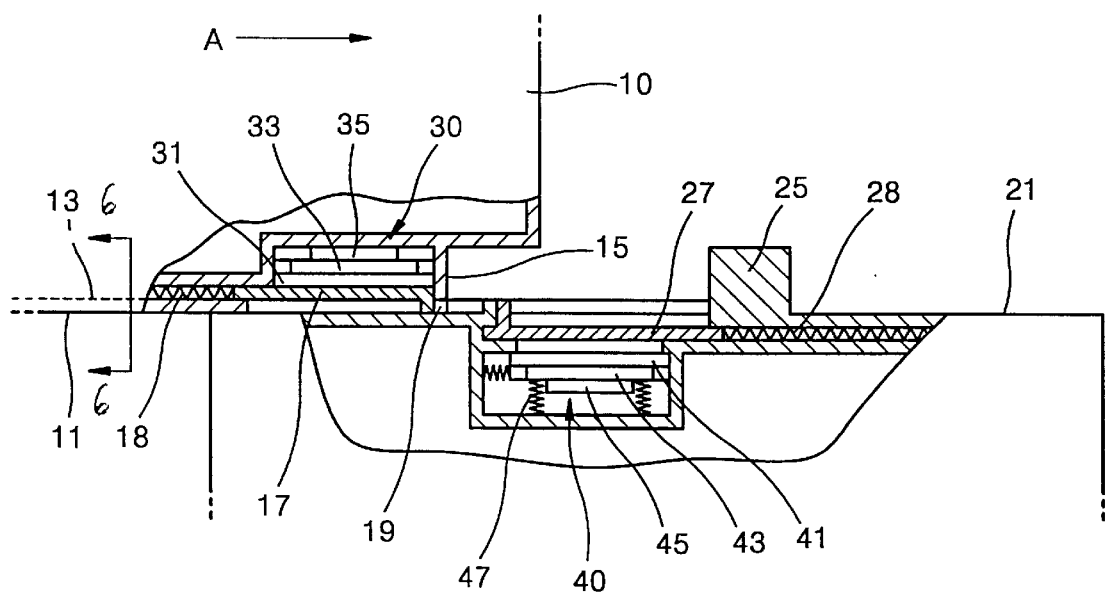
FIG. 5 is a sectional view illustrating a process of coupling the HHPC and the docking station of FIG. 2.

The optical connecting apparatus according to the present invention further comprises a shutting unit for exposing the first and second optical devices 31 and 41 of the HHPC 10 and the docking station 20, respectively, for optical transmission and reception therebetween when the HHPC 10 and the docking station 20 are coupled to each other. Also, the shutting unit blocks the first and second optical devices 31 and 41 from the outside when the HHPC 10 and the docking station 20 are separated from each other. As shown in FIG. 5, the shutting unit includes a first shutter 17, a first spring 18 for elastically biasing the first shutter 17 to cover the first optical device 31, which are formed at the HHPC 10, and a second shutter 27 and a second spring 28, which are formed at the docking station 20. The first shutter 17 is slidably movable to block the first optical device 31 from the outside, and to expose the first optical device 31 to the outside. The second shutter 27 is slidably movable to block the second optical device 41 from the outside, and to expose the second optical device 41 to the outside. When the HHPC 10 is coupled with the docking station 20, the first shutter 17 is caught on a first catch 29 projecting from the coupling side 21 of the docking station 20, so that the first optical device 31 is exposed. Meanwhile, the second shutter 27 is caught on a second catch 19 formed at an edge of the HHPC 10, so that the second optical device 41 is exposed. The second catch 19 has a slit 19a, which serves as a passageway for allowing the first catch 29 to interact with the first shutter 17. On the other hand, when the HHPC 10 is detached from the docking station 20, the first and second shutter 17 and 27 are closed by tension from the first and second springs 18 and 28, respectively, to protect the first and second optical devices 31 and 41 from the outside.

The first embodiment of the optical connecting apparatus according to the present invention connects an HHPC and a docking station as follows.

Figure 6:
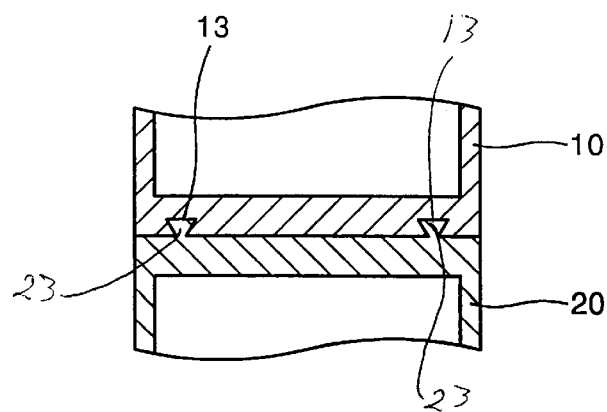
FIG. 6 is a sectional view taken along line 6—6 of FIG. 5.
Figure 7:
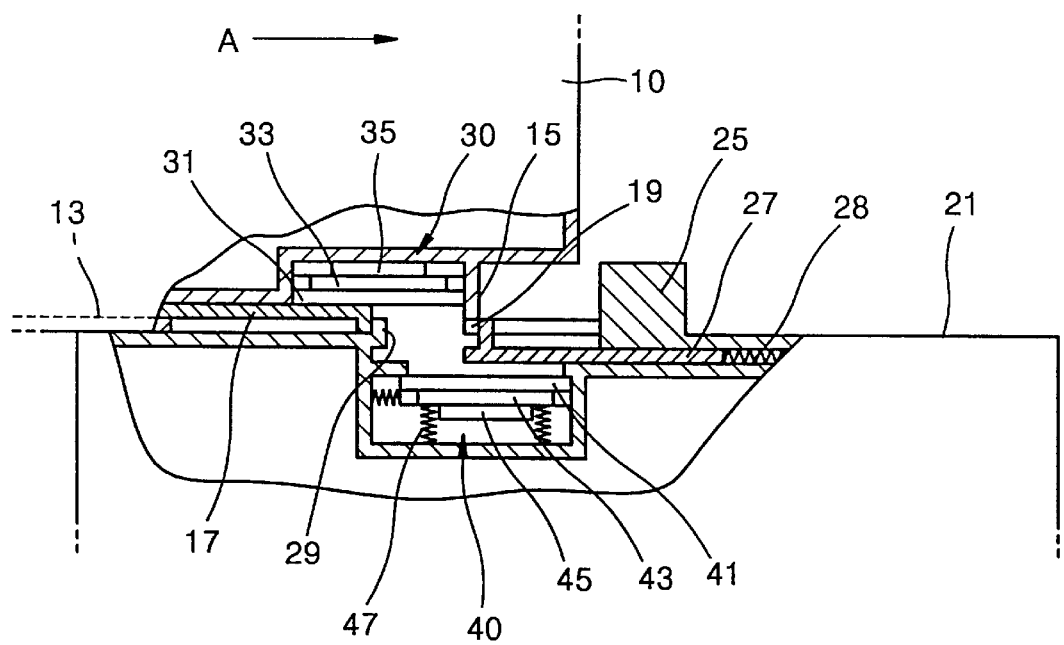
FIG. 7 is a sectional view illustrating the movement of shutters upon coupling between the HHPC and the docking station of FIG. 2.
Figure 8:
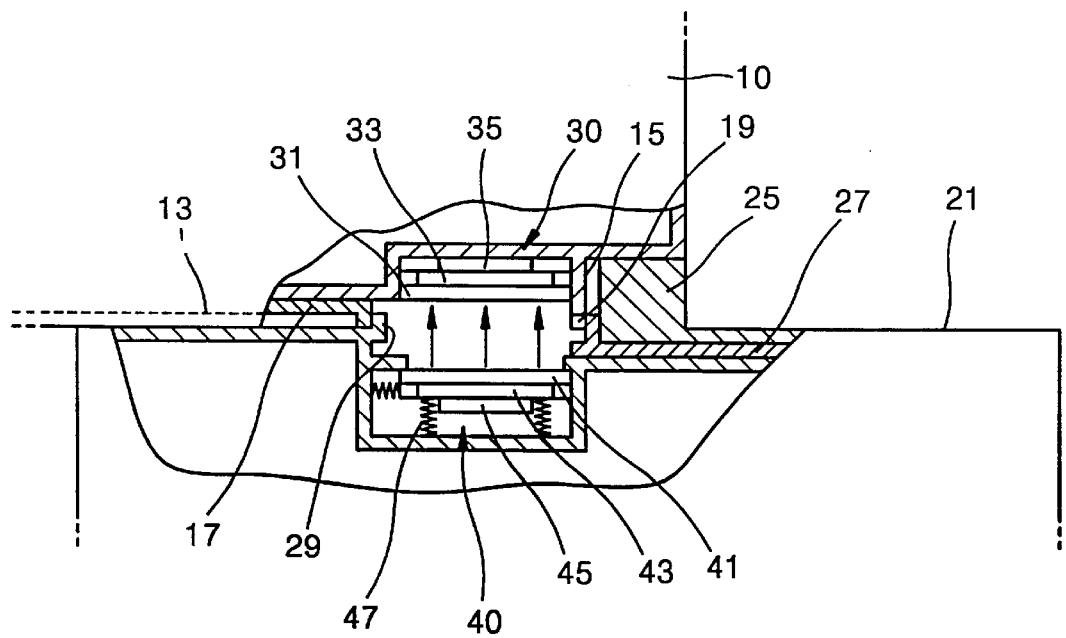
FIG. 8 is a sectional view illustrating the complete connection between the HHPC and the docking station of FIG. 2.

Firstly, the coupling side 11 of the HHPC 10 and the coupling side 21 of the docking station 20 are brought into contact with each other. Next, as shown in FIG. 5, the HHPC 10 is slidably moved in the direction A against the docking station 20. As shown in FIG. 6, the slits 13 start to slide over the rails 23. The HHPC 10 continues to slide in the direction A, the first shutter 17 is engaged by the first catch 19 and opened, as shown in FIG. 7, thereby slowly exposing the first optical device 31. At the same time, the second shutter 27 is engaged by the second catch 19, thereby slowly exposing the second optical device 41. The movement of the HHPC 11 in the direction A is continued until the two stoppers 15 and 25 contact each other, as shown in FIG. 8. In this state, the slits 13 and the rails 23 are completely coupled, and the first and second shutters 17 and 27 are fully opened. As a result, the first and second optical devices 31 and 41 are exposed and aligned facing each other with a predetermined distance for optical transmission and reception, which enables data communications between the HHPC 10 and the docking station 20. As previously described, this slide-type coupling of the HHPC 10 and the docking station 20 is simple, and is easy to accurately align the first and second optical devices 31 and 41 with a strong binding force. Thus, secured data communications can be achieved between the HHPC 10 and the docking station 20.

On the other hand, for separation of the HHPC 10 from the docking station 20, the HHPC 10 is slidably moved against the docking station 20 in the opposite direction to the coupling direction A. Then, the first and second shutters 17 and 27 are shut or closed, and the connection between the slits 13 and the rails 23 is separated.

Figure 9:
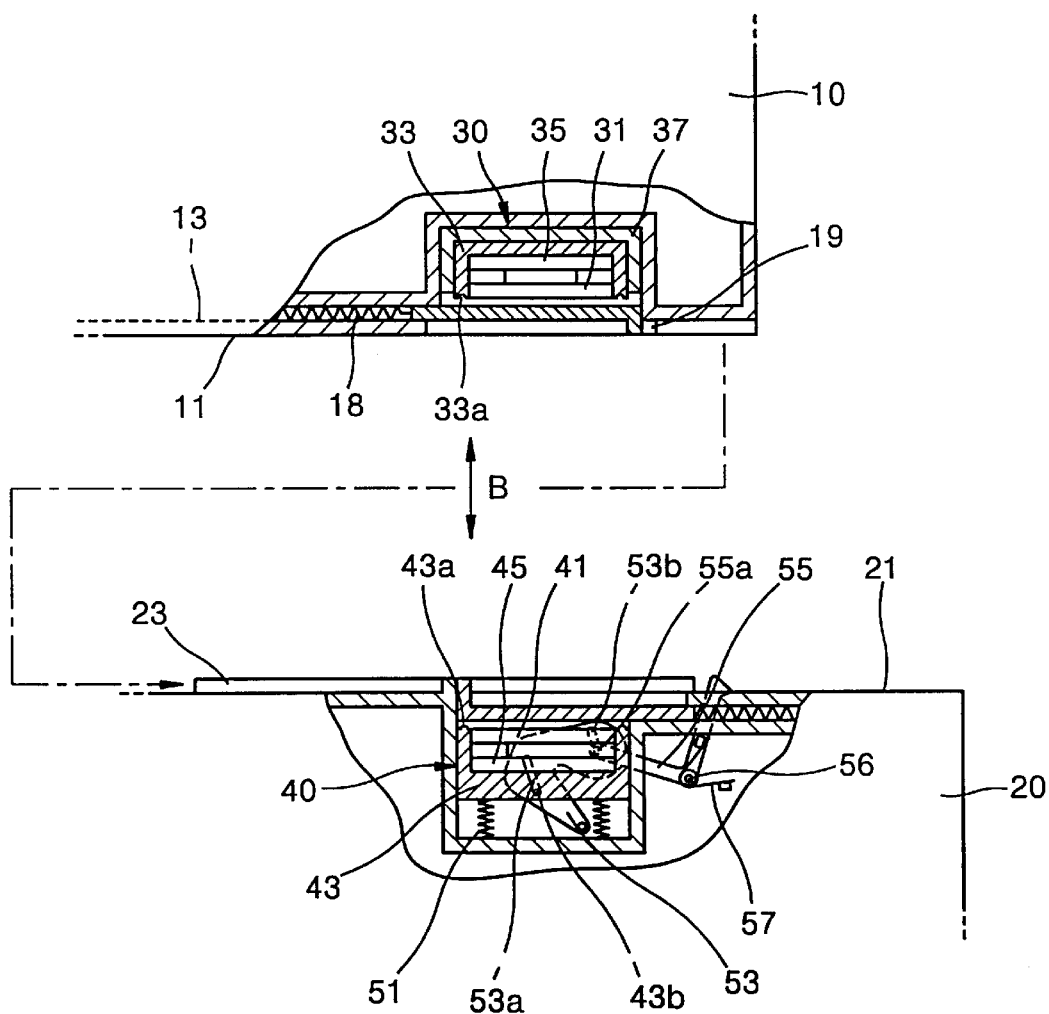
FIG. 9 is a sectional view of another embodiment of the optical connecting apparatus for a HHPC and a docking station according to the present invention.

FIG. 9 is a sectional view of another embodiment of the optical connecting apparatus for an HHPC and a docking station. In FIG. 9, like reference numerals are used to refer to like elements described with reference to FIG. 2.

Referring to FIG. 9, the first optical module 30 is fixed in the HHPC 10. The first optical module 30 includes an elastic member 37 at the exterior of the first core 33 for supporting the first optical device 31 and the first driving circuit 35. The second optical module 40 is installed in the docking station 20 to be movable in the optical transmission direction B, and includes the second core 43 for supporting the second optical device 41 and the second driving circuit 45. Such movable configuration of the second optical module 40 enables the second optical module 40 to be aligned close to the first optical module 30 upon coupling between the HHPC 10 and the docking station 20. Also, guide recessions 33a and guide projections 43a for guiding accurate alignment between the two optical modules 30 and 40 are formed at the first and second cores 33 and 43, respectively, so that they fit together.

The docking station 20 is provided with a moving unit for moving the second optical module 40 in the optical transmission direction B. The moving unit includes an elastic member 51 for elastically biasing the second optical module 40 outwards, a guide pin 43b attached to the second optical module 40, a first rotating lever 53 having a first slot 53a engaged with the guide pin 43b, a second rotating lever 55 capable of interlocking with the first rotating lever 53, and a torsion spring 57.

The guide pin 43b is formed projecting from one side of the second core 43. The first rotating lever 53 is installed to be reciprocally movable between first and second positions. When the first rotating lever 53 is placed at the first position, the first slot 53a is arranged parallel to the optical transmission direction B, so that the second optical module 40 is pushed upwards. Meanwhile, when the first rotating lever 53 is placed at the second position, the first slot 53a is tilted with respect to the optical transmission direction B, which allows the second optical module 40 to be kept within the docking station 20.

The second rotating lever 55 is installed to be rotatable around a hinge 56 in the docking station 20. As the second rotating lever 55 rotates, one end of the second rotating lever 55 extends out of the coupling side 21 and the other end of the second rotating lever 55 is interlocked with the first rotating lever 53.

The torsion spring 57 is inserted at the hinge 56. The torsion spring 57 applies tension to the second rotating lever 55 to push the one end of the second rotating lever 55 out of the coupling side 21 of the docking station 20. As the HHPC 10 slides over the rails 23 of the docking station 20 and presses the one end of the second rotating level 55, which projects from the coupling side 21, the second rotating lever 55 rotates and places the first rotating lever 53 into the first position. For such interlocking with the first rotating lever 53, the second rotating lever 55 is provided with a keeper 55a at the other end. The keeper 55a is engaged with a second slot 53b of the first rotating lever 53. Preferably, the second slot 53b is formed parallel to the first slot 53b. If the first and second slots 53a and 53b are parallel to each other, the keeper 55a and the guide pin 43b can slide along the second and first slots 53b and 53a, respectively, at the same time, which enables smooth rotation of the first rotating lever 53.

The further embodiment of the optical connecting apparatus shown in FIG. 9 connects an HHPC and a docking station as follows.

Figure 10:
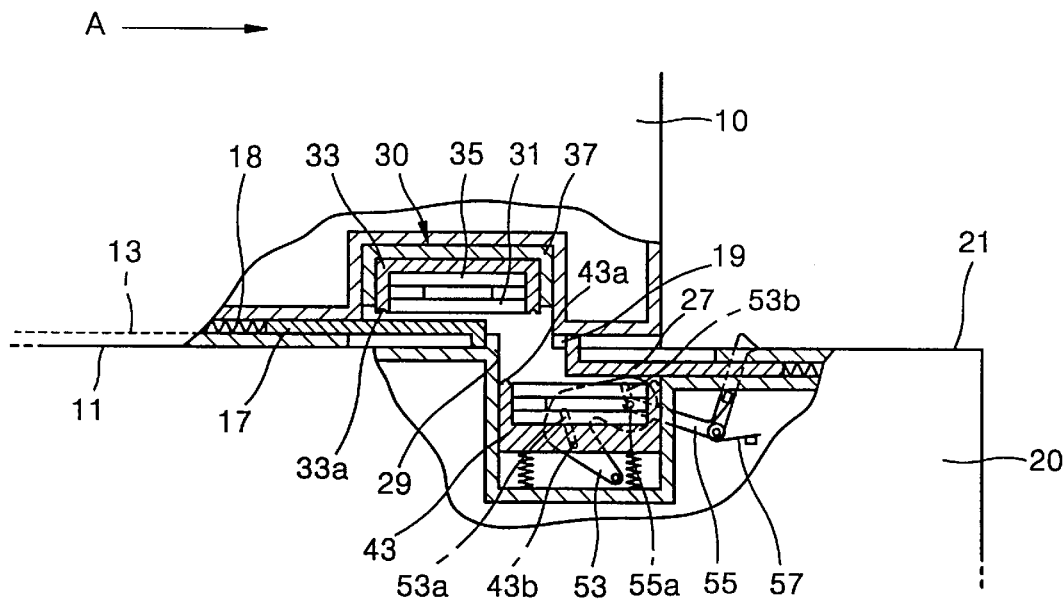
FIG. 10 is a sectional view illustrating a process of coupling the HHPC and the docking station of FIG. 9.

Referring to FIG. 10, firstly the coupling side 11 of the HHPC 10 and the coupling side 21 of the docking station 20 are brought into contact with each other. Next, the HHPC 10 is slidably pushed toward the docking station 20 in the coupling direction A. As previously described with reference to FIG. 6, the slits 13 start to slide over the rails 23. During the coupling, the first and second shutters 17 and 27 are engaged by the first and second catches 19 and 29, respectively, thereby slowly exposing the first and second optical devices 31 and 41 to be aligned facing each other.

Figure 11:
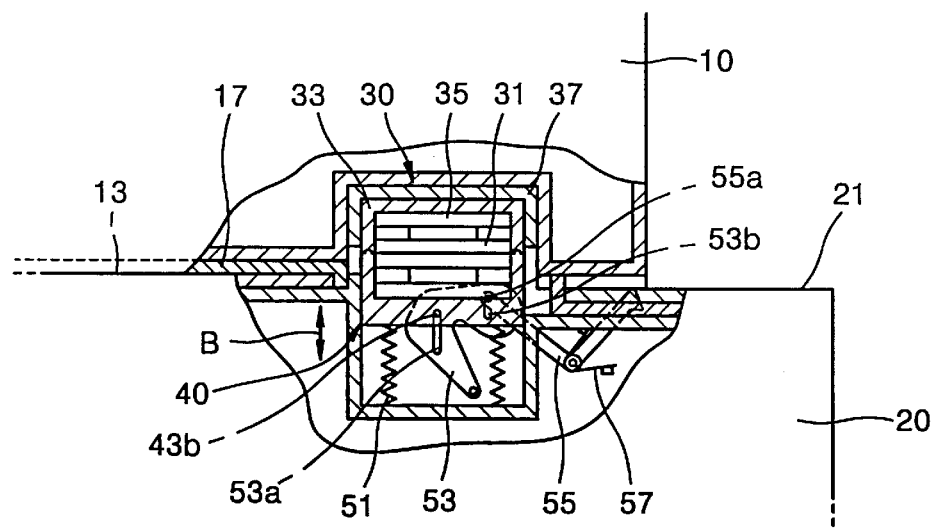
FIG. 11 is a sectional view illustrating the complete connection between the HHPC and the docking station of FIG. 9.

When the HHPC 10 and the docking station 20 are coupled to some extent, as shown in FIG. 11, the one end of the second rotating lever 55 is pressed by the coupling side 11 of the HHPC 10. As a result, the second rotating lever 55 starts to rotate and the keeper 53b slides along the second slot 53b, thereby rotating the first rotating lever 53. When the first rotating lever 53 is brought into the first position, the first slot 53a is arranged parallel to the optical transmission direction B, which allows the guide pin 43b to slide along the first slot 53a in the optical transmission direction B. As a result, the second optical module 40 is pushed upwards close to the first optical module 30 by the elastic member 51. As the guide projections 43a fit in the guide recessions 33a, the coupling of the HHPC 10 and the docking station 20 is completed for optical transmission and reception between the first and second optical devices 31 and 41.

Figure 12:
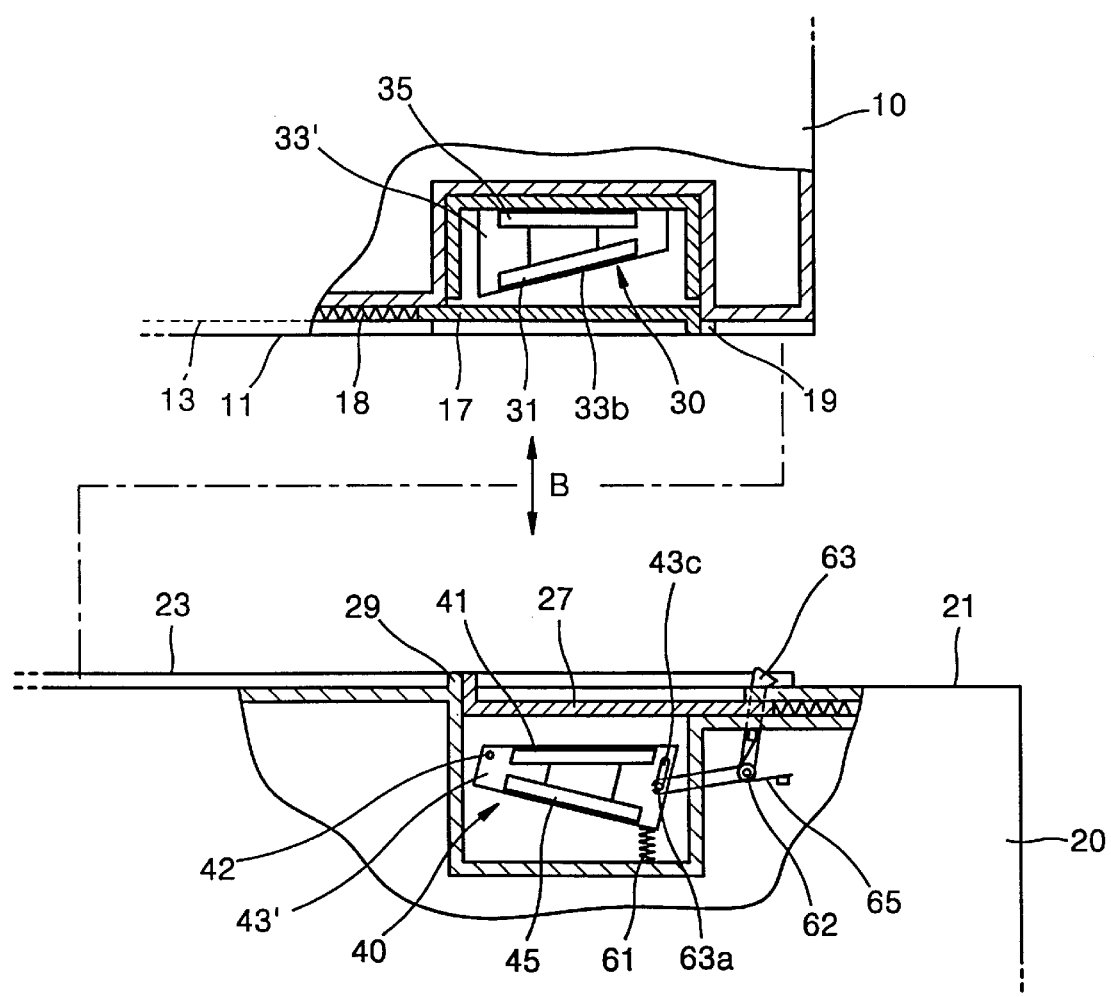
FIG. 12 is a sectional view of still another embodiment of the optical connecting apparatus for a HHPC and a docking station according to the present invention.

FIG. 12 is a sectional view of still another embodiment of the optical connecting apparatus for an HHPC and a docking station according to the present invention. In FIG. 12, like reference numerals are used to refer to like elements illustrated in FIG. 9.

Referring to FIG. 12, the first optical module 30 fixed in the HHPC 10 includes a third core 33'. The third core 33' has a slanted surface 33b at a predetermined angle with respect to the coupling side 11, on which the first optical device 31 is mounted.

The second optical module 40 is rotatably installed around a predetermined hinged point 42 in the docking station 20. The second optical module 40 includes a fourth core 43' for supporting the second optical device 41 and the second driving circuit 45. In particular, the fourth core 43' is rotatable around the hinged point 42 and thus it can be placed into a third position or a fourth position. The third position refers to the position at which the second optical device 41 is aligned with the first optical device 41 with a predetermined distance facing each other. Meanwhile, the fourth position refers to the position at which the second optical device 41 is separated from the first optical device 30. The shifting of the fourth core 43' between the third and fourth positions is achieved by a predetermined rotating unit.

The rotating unit is installed in the docking station 20, and includes a spring 61 for elastically biasing the second optical module 40 into the third position, a rotating member 63 and a torsion spring 65. The rotating member 63 is rotatably installed around a hinge 62. One end of the rotating member 63 extends out of the coupling side 21, and the other end of the rotating member 63 is connected to the fourth core 43' having a guide slot 43c. The torsion spring 65 is fitted at the hinge 62, and applies strong tension to the rotating member 63 as the one end of the rotating member 63 further protrudes from the coupling side 21. The rotating member 63 has a guide pin 63a at the other end. As the rotating member 63 rotates, the guide pin 63a moves along the guide slot 43c of the fourth core 43'. The engagement of the guide pin 63a with the guide slot 43c enables the second optical mode 40 to interlock with the rotating member 63.

Figure 13:
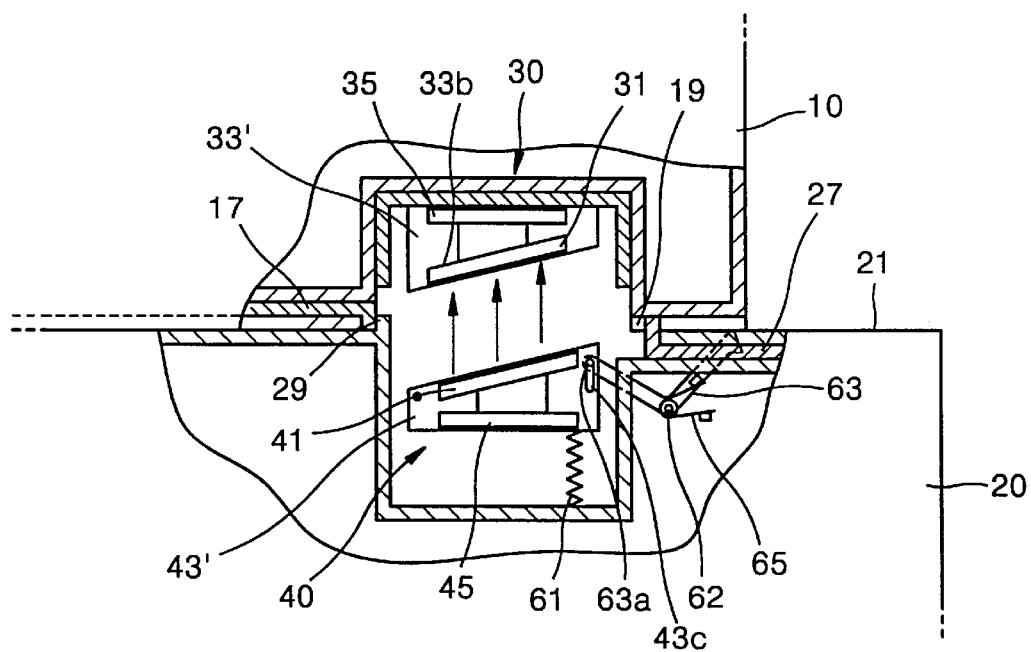
FIG. 13 is a sectional view illustrating the complete connection between the HHPC and the docking station of FIG. 12.
Figure 1:
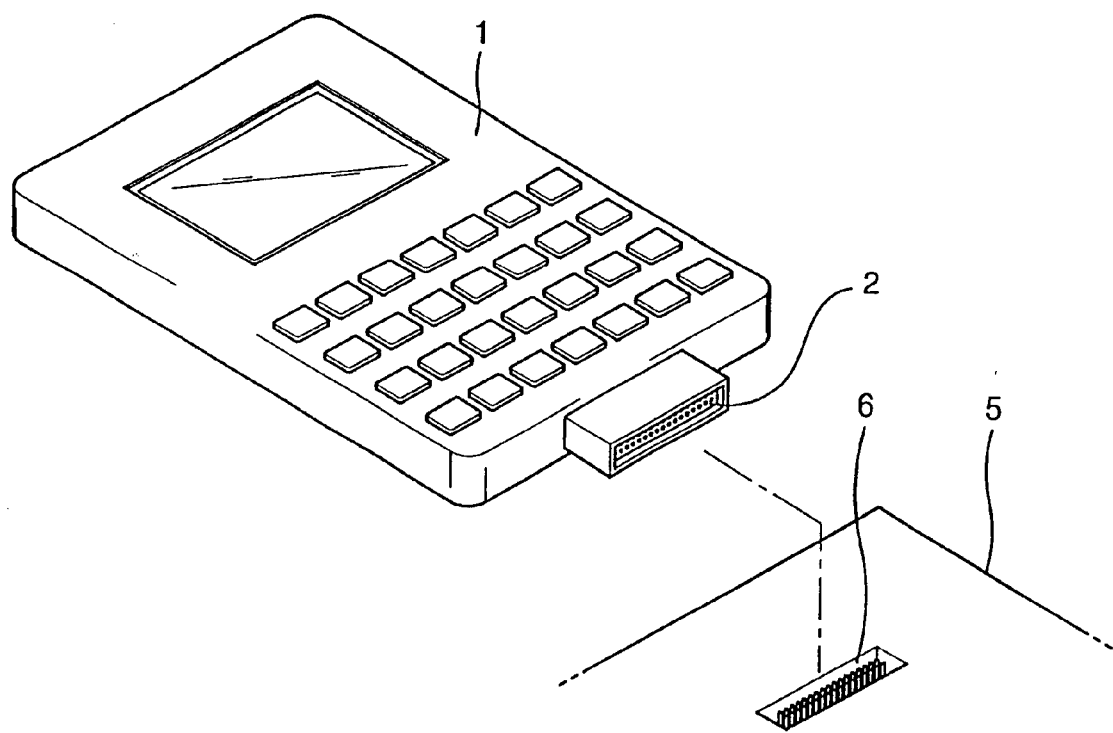
Figure 2:
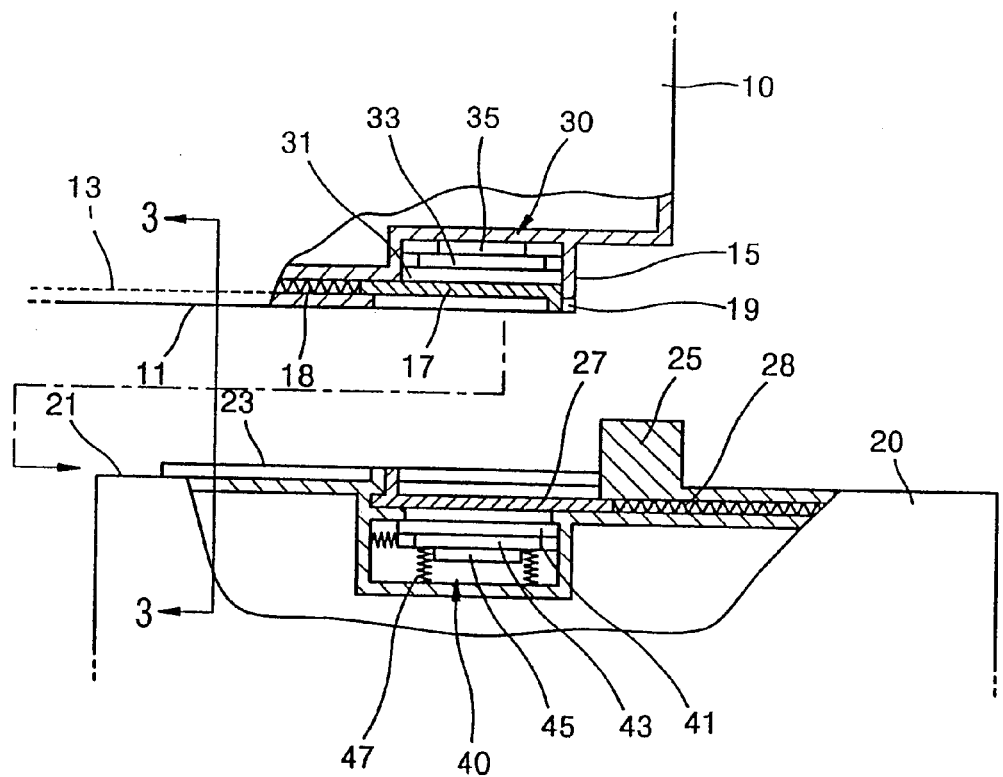
Figure 3:
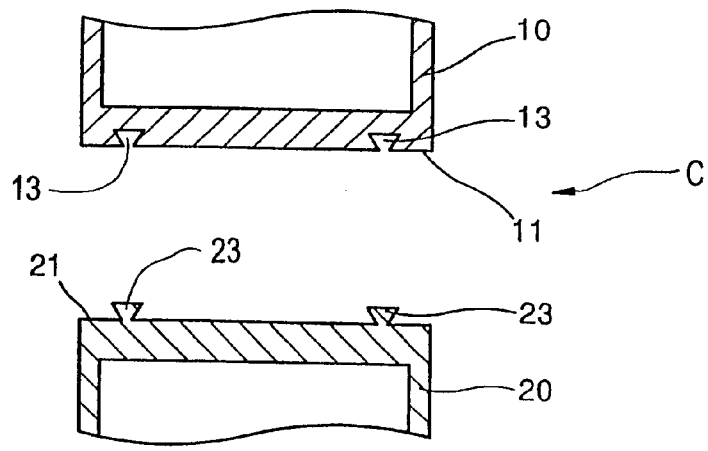
Figure 4:
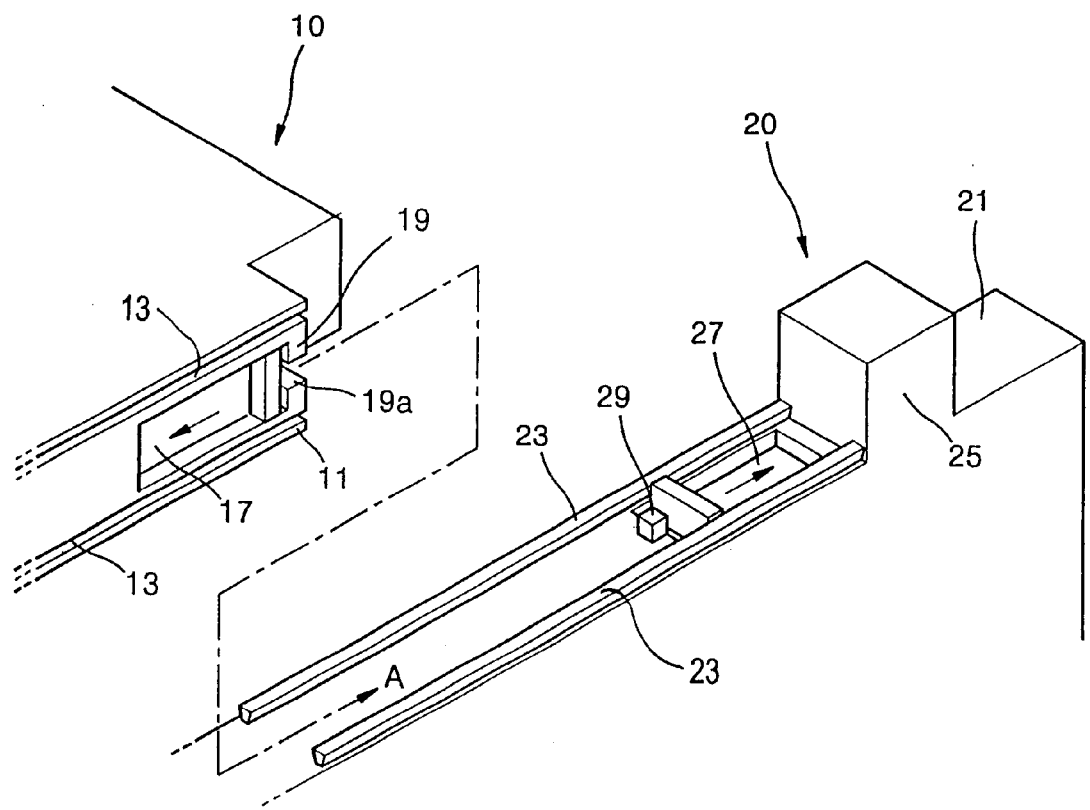
Figure 5:
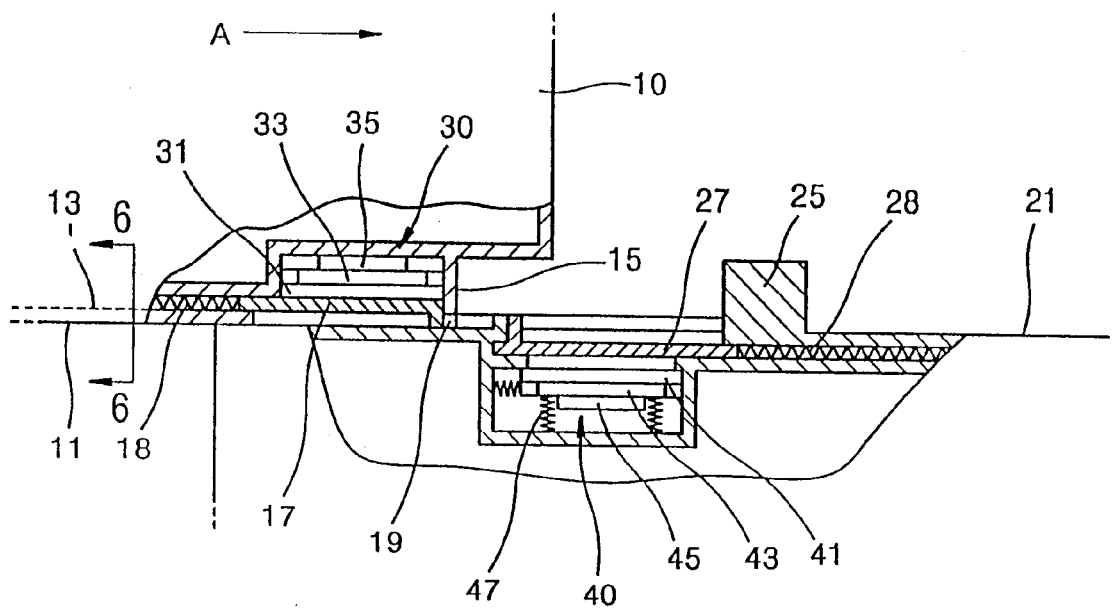
Figure 6:
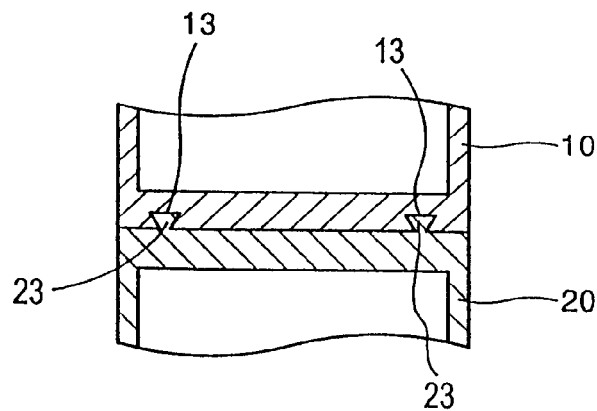
Figure 7:
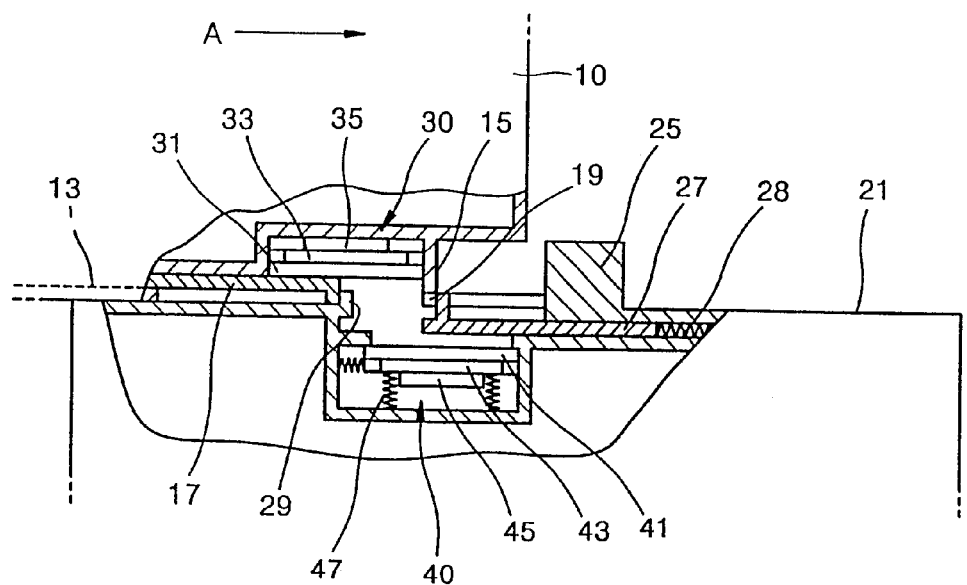
Figure 8:
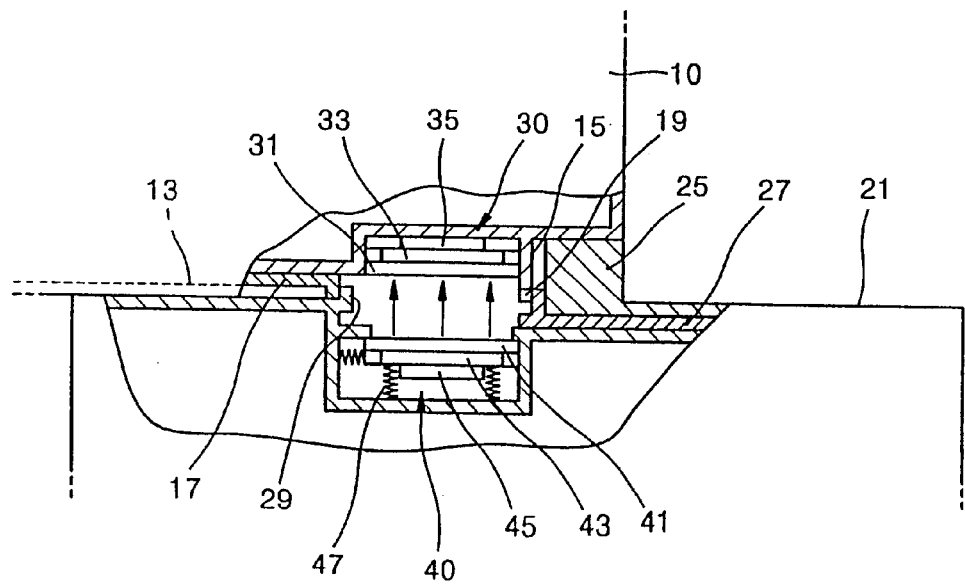
Figure 9:
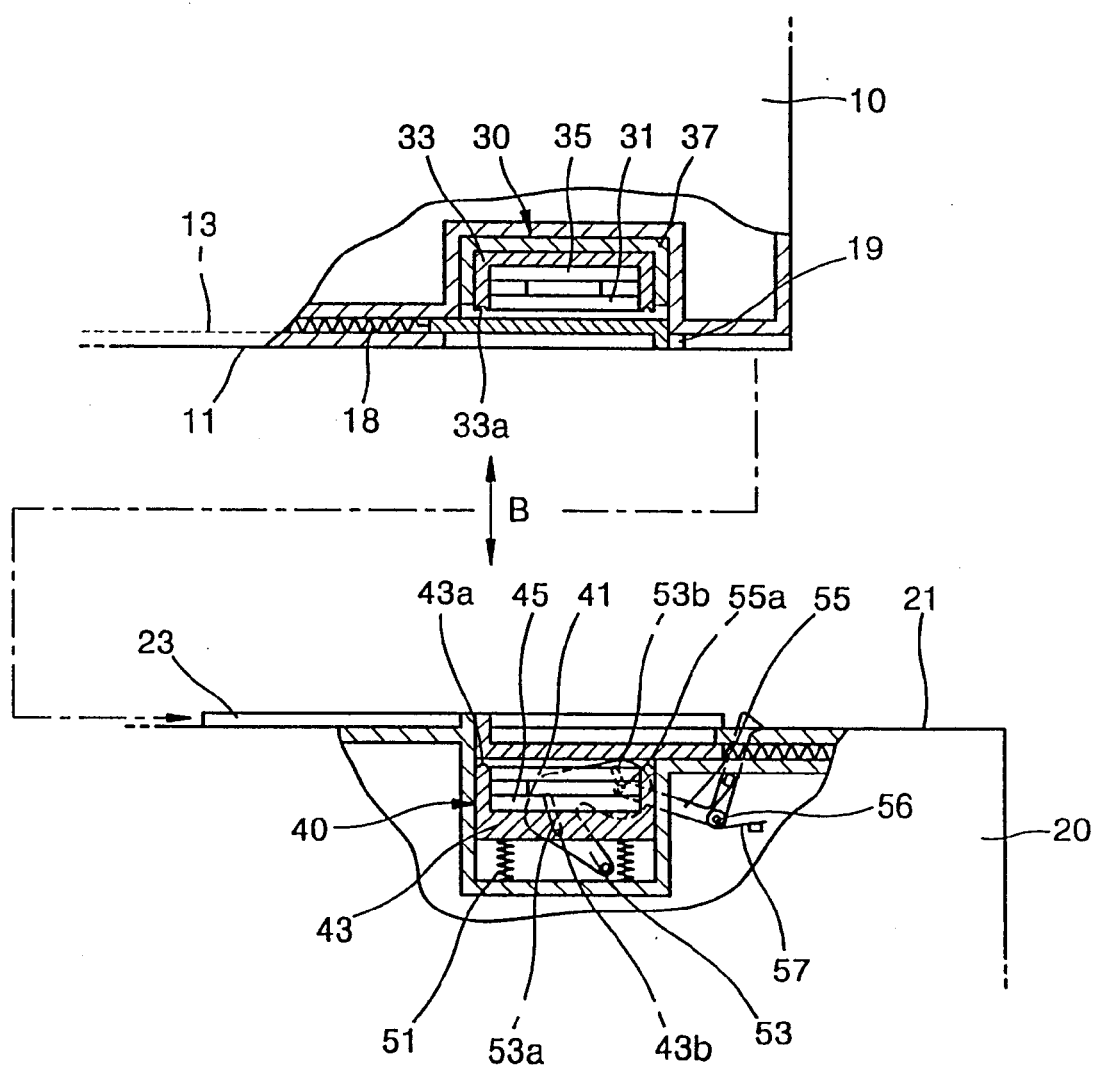
Figure 10:
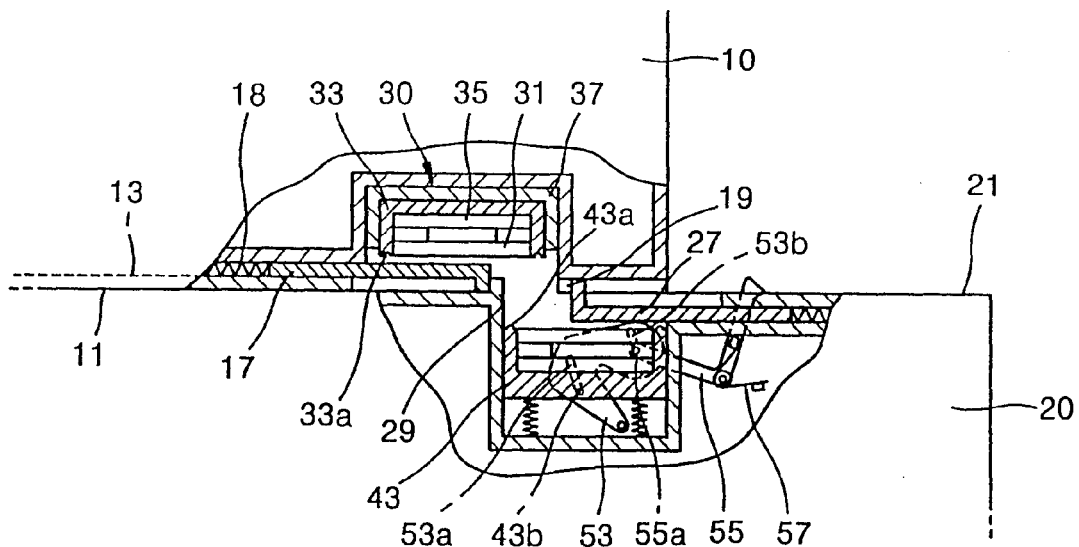
Figure 11:
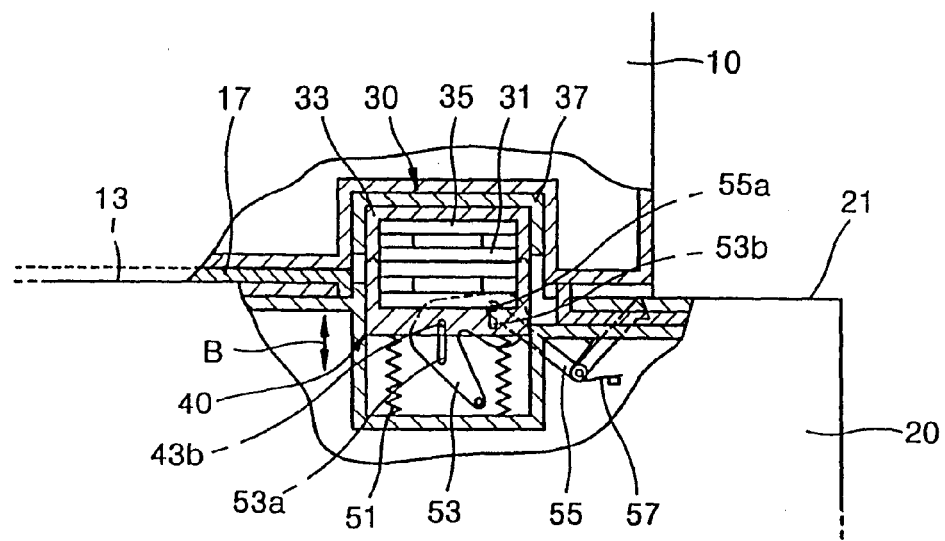
Figure 12:
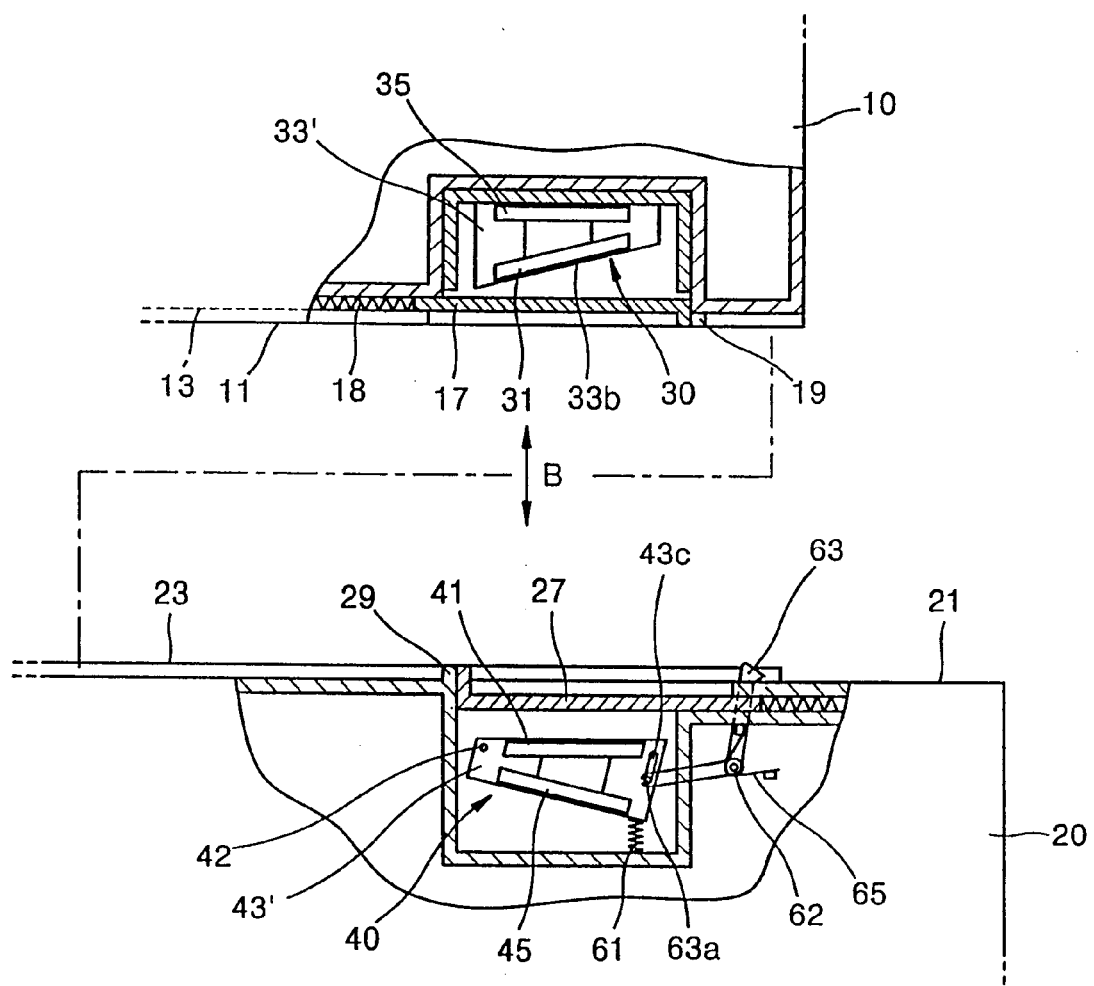
Figure 13:
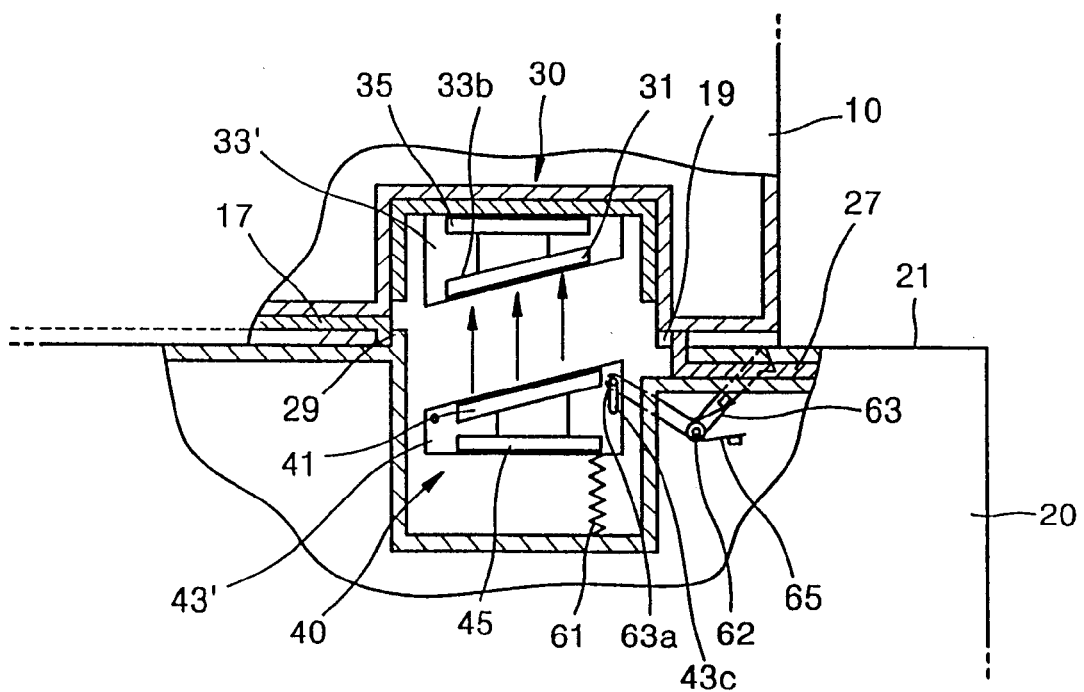

As for the optical connecting apparatus shown in FIG. 12, the coupling of the HHPC 10 and the docking station 12 is initiated by inserting the rails 23 into the slits 13. While the slits 13 and the rails 23 are slidably coupled, the first shutter 17 is caught on the first catch 19 and opened to expose the first optical device 31. On the other hand, the second shutter 27 is opened by the second catch 29 to expose the second optical device 31. As the one end of the rotating member 63 projecting out of the coupling side 21 is pressed by the HHPC 10, the rotating member 63 starts to rotate and the guide pin 63a moves along the guide slot 43c, thereby placing the second optical module 40 into the third position. In turn, the second optical module 40 is pushed upwards by tension applied from the spring 61, as much as the moving distance of the rotating member 63. As a result, as shown in FIG. 13, the second optical device 41 is aligned facing the first optical device 31 with a predetermined distance therebetween, so that mutual optical transmission and reception can be realized between the first and second optical devices 31 and 41, which enables data communications between the HHPC 10 and the docking station 20.

On the other hand, the HHPC 10 is detached from the docking station 20 in the reverse order. In particular, as the HHPC 10 is slidably pushed in the opposite direction to the coupling direction against the docking station 20, the slits 13 start to slide out of the rails 23, thereby allowing the one end of the rotating member 63 to be free from the pressure by the coupling side 11. The one end of the rotating member 63 projects out of the coupling side 21 by tension of the torsion spring 65. As a result, the guide pin 63a moves into its original position within the guide slot 43c, thereby placing the second optical module 40 back into the fourth position to separate the first and second optical devices 31 and 41 from each other. As the slits 13 are completely separated from the rails 23, the first and second shutters 17 and 27 are shut or closed to block the first and second optical modules 30 and 40 from the outside.

As previously described, the optical connecting apparatus for a HHPC and a docking station according to the present invention adopts a simple slide-type coupling structure including rails and slits. Use of such rails and slits, which can be accommodated within a small space, contributes to producing miniature products.

The slide-type coupling is easy to be implemented with an improved binding force without using additional locking elements. In addition, the optical devices can be accurately aligned by just coupling a HHPC with a docking station.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical connecting apparatus for a hand-held personal computer (HHPC) and a docking station, comprising:
   a first optical module installed in the HHPC, having a first optical device which converts an electrical signal and/or an optical signal into an optical signal and/or an electrical signal, respectively;
   a second optical module installed in the docking station, having a second optical device which converts an electrical signal and/or an optical signal into an optical signal and/or an electrical signal, respectively; and
   a coupling unit which transversely, slidably couples the HHPC and the docking station such that coupling sides of the HHPC and the docking station contact each other, thereby aligning the first and second optical devices for optical transmission and reception.

2. The optical connecting apparatus of claim 1, wherein the coupling unit comprises:
   at least one slit formed at one of the coupling sides; and
   at least one rail formed projecting from an other of coupling sides, to be transversely, slidably fitted with the at least one slit.

3. The optical connecting apparatus of claim 1, wherein the first optical module comprises:
   a first core which supports the first optical device so that the first optical device is exposed to an outside; and
   a first driving circuit which drives the first optical device.

4. The optical connecting apparatus of claim 3, wherein the first optical module further comprises an elastic member installed between the first core and an other side of the HHPC far from the coupling side, for absorbing impact.

5. The optical connecting apparatus of claim 1, wherein the second optical module comprises:
   a second core which supports the second optical device so that the second optical device is exposed to an outside; and
   a second driving circuit which drives the second optical device.

6. The optical connecting apparatus of claim 5, wherein the second core is installed to be movable, and the second optical module further comprises a plurality of springs for elastically biasing the second core in at least two directions to fix the position of the second core, and absorbing impact applied to the second core.

7. The optical connecting apparatus of claim 1, further comprising a pair of stoppers formed at the coupling sides of the HHPC and the docking station, respectively,
   wherein the stoppers restrict a sliding distance when the HHPC is slidably coupled with the docking station for alignment of the first and second optical devices.

8. The optical connecting apparatus of claim 1, further comprising a shutting unit which exposes the first optical device and/or the second optical device facing each other when the HHPC and the docking station are coupled to each other, and which blocks the first optical device and/or the second optical device from an outside when the HHPC and the docking station are separated from each other.

9. The optical connecting apparatus of claim 8, wherein the shutting unit comprises:
   a first shutter installed to be slidably movable in the HHPC, for blocking and exposing the first optical device from and to the outside;
   a first spring for elastically biasing the first shutter to cover the first optical device;
   a second shutter installed to be slidably movable in the docking station, for blocking and exposing the second optical device from and to the outside;
   a second spring for elastically biasing the first shutter to cover the second optical device; and
   first and second catches installed at the HHPC and the docking station, respectively, for catching the first and second shutters, respectively, when the HHPC and the docking station are coupled each other, to expose the first and second optical devices, respectively.

10. The optical connecting apparatus of claim 1, wherein the second optical module is installed to be movable in an optical transmission direction, and the optical connecting apparatus further comprises a moving unit for moving the second optical module towards the first optical module when the HHPC and the docking stations are coupled to each other, to align the first and second optical device with a predetermined distance therebetween, and for placing the second optical module back into its original position.

11. The optical connecting apparatus of claim 10, wherein the moving unit comprises:
   an elastic member for elastically biasing the second optical module outwardly;
   a guide pin mounted at the second optical module;
   a first rotating lever having a first slot for guiding the movement of the second optical module along with the guide pin, the first rotating lever installed in the docking station to be movable between a first position where the second optical module is allowed to move outwardly, and a second position where the second optical module is kept within the docking station;
   a second rotating lever whose one end, which extends from a hinge projects out of the coupling side of the docking station, and whose other end, which extends from the hinge, is connected to the first rotating lever, the second rotating lever rotating when the one end is pressed by the HHPC slidably coupled with the docking station, thereby placing the first rotating lever into the first position; and
   a torsion spring for elastically biasing the second rotating lever to project the one end of the second rotating lever from the coupling side of the docking station.

12. The optical connecting apparatus of claim 11, wherein the second rotating lever has a keeper at the other end, and the second rotating lever has a second slot for guiding the movement of the first rotating lever between the first and second positions, along with the keeper.

13. The optical connecting apparatus of claim 10, wherein the first and second optical modules have a guide groove and a guide projection, respectively, which fit together, for alignment between the first and second optical devices.

14. The optical connecting apparatus of claim 1, wherein the first optical module comprises a third core with a slanted side in the HHPC, for supporting the first optical device at a predetermined angle with respect to the coupling side, and the second optical module comprises a fourth core rotatably installed in the docking station, for supporting the second optical device,
  wherein the optical connecting apparatus further comprises a rotating unit for rotating the second optical module into a third position to align the second optical device with the first optical device when the HHPC and the docking station are coupled to each other, and into a fourth position to retain the second optical device within the docking station when the HHPC is detached from the docking station.

15. The optical connecting apparatus of claim 14, wherein the rotating unit comprises:
  a spring for elastically biasing the second optical module into the third position;
  a rotating member whose one end, which extends from a hinge projects out of the coupling side of the docking station, and whose other end, which extends from the hinge, is connected to the fourth core, the rotating member rotating when the one end is pressed by the HHPC slidably coupled with the docking station, thereby placing the second optical module into the third position; and
  a torsion spring for elastically biasing the rotating member to project the one end of the rotating member from the coupling side of the docking station so as to suppress the movement of the second optical module into the third position.

16. The optical connecting apparatus of claim 15, wherein the rotating member has a guide pin at the other end, and the fourth core has a slot for guiding the movement of the second optical module between the third and fourth positions, along with the guide pin.

17. An optical connecting apparatus for a hand-held personal computer (HHPC) and a docking station, comprising:
  a first optical module installed in the HHPC, having a first optical device which converts an electrical signal and/or an optical signal into an optical signal and/or an electrical signal, respectively;
  a second optical module installed in the docking station, having a second optical device which converts an electrical signal and/or an optical signal into an optical signal and/or an electrical signal, respectively;
  a coupling unit which slidably couples the HHPC and the docking station such that coupling sides of the HHPC and the docking station contact each other, thereby aligning the first and second optical devices for optical transmission and reception; and
  a shutting unit which exposes the first optical device and/or the second optical device facing each other when the HHPC and the docking station are coupled to each other, and which blocks the first optical device and/or the second optical device from an outside when the HHPC and the docking station are separated from each other.

18. An optical connecting apparatus for a hand-held personal computer (HHPC) and a docking station, comprising:
  a first optical module installed in the HHPC, having a first optical device which converts an electrical signal and/or an optical signal into an optical signal and/or an electrical signal, respectively;
  a second optical module installed in the docking station, having a second optical device which converts an electrical signal and/or an optical signal into an optical signal and/or an electrical signal, respectively; and
  a coupling unit which slidably couples the HHPC and the docking station such that coupling sides of the HHPC and the docking station contact each other, thereby aligning the first and second optical devices for optical transmission and reception,
  wherein the second optical module is installed to be movable in an optical transmission direction, and the optical connecting apparatus further comprises a moving unit for moving the second optical module towards the first optical module when the HHPC and the docking stations are coupled to each other, to align the first and second optical device with a predetermined distance therebetween, and for placing the second optical module back into its original position.

19. An optical connecting apparatus for a hand-held personal computer (HHPC) and a docking station, comprising:
  a first optical module installed in the HHPC, having a first optical device which converts an electrical signal and/or an optical signal into an optical signal and/or an electrical signal, respectively;
  a second optical module installed in the docking station, having a second optical device which converts an electrical signal and/or an optical signal into an optical signal and/or an electrical signal, respectively; and
  a coupling unit which slidably couples the HHPC and the docking station such that coupling sides of the HHPC and the docking station contact each other, thereby aligning the first and second optical devices for optical transmission and reception,
  wherein the first optical module comprises a third core with a slanted side in the HHPC, for supporting the first optical device at a predetermined angle with respect to the coupling side, and the second optical module comprises a fourth core rotatably installed in the docking station, for supporting the second optical device, and wherein the optical connecting apparatus further comprises a rotating unit for rotating the second optical module into a third position to align the second optical device with the first optical device when the HHPC and the docking station are coupled to each other, and into a fourth position to retain the second optical device within the docking station when the HHPC is detached from the docking station.

* * * * *

UNITED STATES PATENT AND TRADEMARK OFFICE
CERTIFICATE OF CORRECTION

PATENT NO.     : 6,595,423 B2
DATED          : July 22, 2003
INVENTOR(S)    : Woo-jong Cho and Jung-bum Seo It is certified that error appears in the above-identified patent and that said Letters Patent is hereby corrected as shown below:

Please delete the formal drawings as reflected in the printed patent, and replace them with the attached formal drawings.

Signed and Sealed this

Tenth Day of August, 2004

JON W. DUDAS
*Acting Director of the United States Patent and Trademark Office*